US007890426B2

(12) United States Patent
Maloney

(10) Patent No.: US 7,890,426 B2
(45) Date of Patent: Feb. 15, 2011

(54) METHOD AND SYSTEM FOR VERIFYING CHECK IMAGES

(75) Inventor: Rian R. Maloney, Plano, TX (US)

(73) Assignee: VECTORsgi, Inc., Addison, TX (US)

( * ) Notice: Subject to any disclaimer, the term of this patent is extended or adjusted under 35 U.S.C. 154(b) by 1555 days.

(21) Appl. No.: 10/993,814

(22) Filed: Nov. 19, 2004

(65) Prior Publication Data

US 2006/0112013 A1 May 25, 2006

(51) Int. Cl.
*G06Q 40/00* (2006.01)
(52) U.S. Cl. .............................. 705/45; 705/35; 705/42; 705/44
(58) Field of Classification Search ................... 705/35, 705/42, 44, 45, 36, 36 R, 36 T
See application file for complete search history.

(56) References Cited

U.S. PATENT DOCUMENTS

| | | | |
|---|---|---|---|
| 5,265,007 A | 11/1993 | Barnhard, Jr. et al. | |
| 5,373,550 A | 12/1994 | Campbell et al. | |
| 5,444,794 A | 8/1995 | Uhland, Sr. | |
| 5,583,759 A | 12/1996 | Geer | |
| 5,631,984 A * | 5/1997 | Graf et al. ................. | 382/317 |
| 5,680,611 A | 10/1997 | Rail et al. | |
| 5,717,868 A | 2/1998 | James | |
| 5,748,780 A * | 5/1998 | Stolfo ........................ | 382/232 |
| 5,910,988 A | 6/1999 | Ballard | |
| 5,930,778 A | 7/1999 | Geer | |
| 5,936,219 A | 8/1999 | Yoshida et al. | |
| 6,032,137 A | 2/2000 | Ballard | |
| 6,181,814 B1 | 1/2001 | Carney | |
| 6,243,492 B1 | 6/2001 | Kamei | |
| 6,464,134 B1 | 10/2002 | Page | |
| 6,728,397 B2 | 4/2004 | McNeal | |
| 6,760,470 B1 | 7/2004 | Bogosian et al. | |
| 6,792,110 B2 | 9/2004 | Sandru | |
| 6,808,109 B2 | 10/2004 | Page | |
| 6,829,389 B1 | 12/2004 | Arakawa et al. | |
| 7,069,250 B2 * | 6/2006 | Meadow et al. ............... | 705/75 |
| 7,216,106 B1 * | 5/2007 | Buchanan et al. ............ | 705/45 |
| 2002/0056043 A1 * | 5/2002 | Glass ......................... | 713/179 |
| 2002/0156712 A1 * | 10/2002 | Rambhia ..................... | 705/36 |
| 2004/0068464 A1 * | 4/2004 | Buchanan et al. ............ | 705/38 |
| 2004/0247168 A1 | 12/2004 | Pintsov et al. | |
| 2004/0260636 A1 | 12/2004 | Marceau et al. | |
| 2005/0015317 A1 | 1/2005 | Rodriguez et al. | |
| 2005/0033685 A1 * | 2/2005 | Reyes ......................... | 705/39 |
| 2005/0033690 A1 | 2/2005 | Antognini et al. | |

(Continued)

OTHER PUBLICATIONS

Armstrong, Douglas. Pay to the order of . . . everybody People love paper checks; so do their banks. Nov. 28, 1999. Milwaukee Journal Sentinel. Milwaukee, Wis. [Final Edition], p. 1.*

(Continued)

*Primary Examiner*—Shahid R Merchant
(74) *Attorney, Agent, or Firm*—Fish & Richardson P.C.

(57) ABSTRACT

In one embodiment, example software is operable to determine a first hash value for an electronic check image, with the check image operable to generate an image replacement document. The hash value is associated with the electronic check image. The electronic check image and the associated hash value is communicated to a recipient for processing.

13 Claims, 3 Drawing Sheets

U.S. PATENT DOCUMENTS

2005/0033696 A1 2/2005 Kallin
2005/0071283 A1* 3/2005 Randle et al. ................. 705/75

OTHER PUBLICATIONS

International Search Report (forms PCT/ISA/220 and PCT/ISA/210) and Written Opinion of the International Searching Authority (form PCT/ISA/237) dated Mar. 2, 2006 issued in counterpart International Application No. PCT/US2005/040556; 12 pages.

"*Banking's Role in Tomorrow's Payments System—Payments System Overview*," vol. II, Furash & Company, Jun. 1994, 162 pages.

Communication Pursuant to Article 94(3) EPC issued in counterpart European Application No. 05820889.3; Apr. 18, 2008; 3 pages.

* cited by examiner

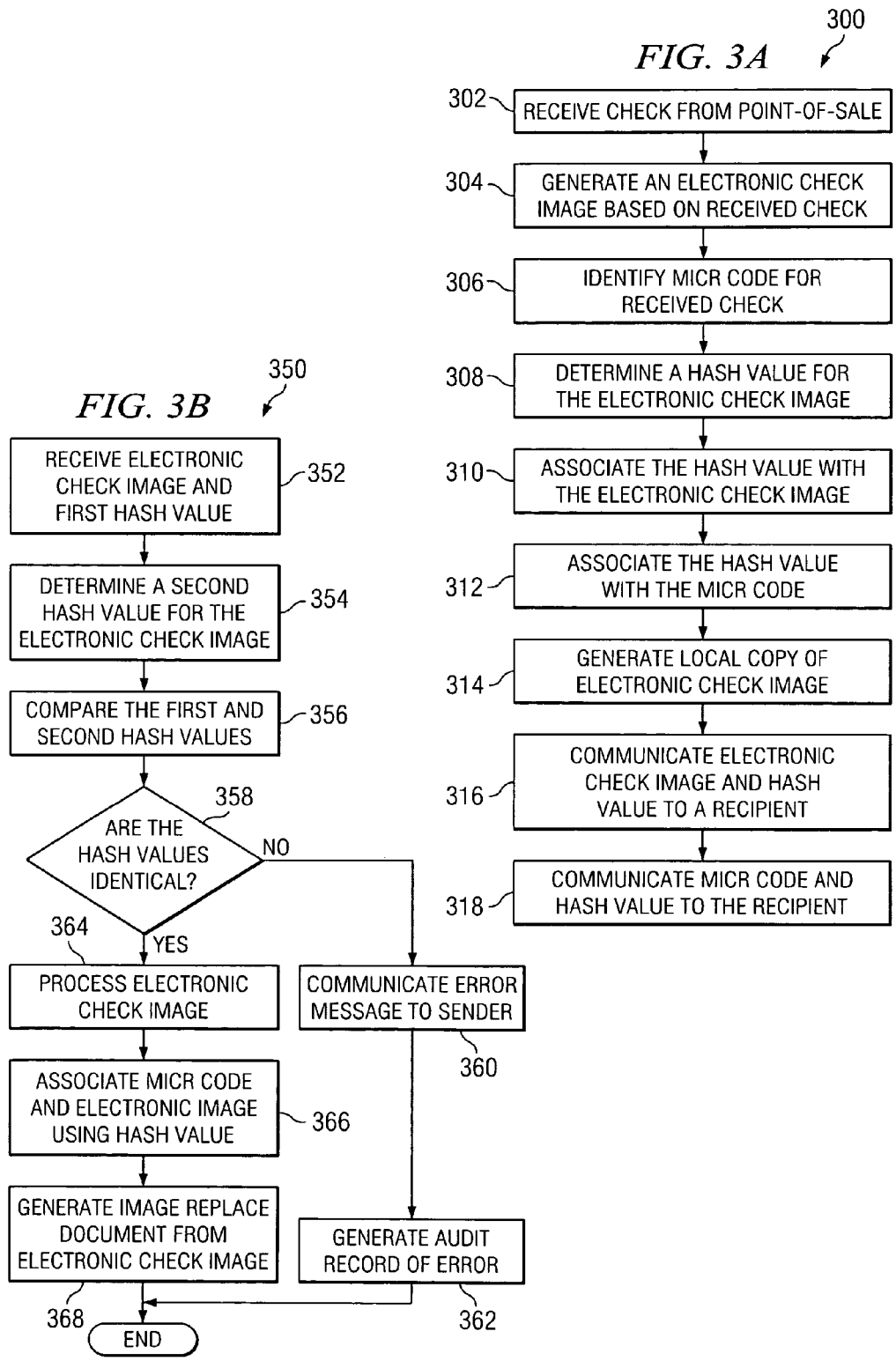

METHOD AND SYSTEM FOR VERIFYING CHECK IMAGES

TECHNICAL FIELD

This invention relates to check processing and, more specifically, to a method and system for verifying electronic check images.

BACKGROUND

Currently, the bank of first deposit receives a physical check from the point-of-sale (or point-of purchase), processes the check using any suitable technique, and then communicates the physical check to the recipient (or payor) bank for storage or forwarding to the appropriate account holder. For example, the checks are typically sorted according to payor bank, bundled together, and physically shipped to the receiving bank. This physical handling of checks and other commercial paper transactions requires large amount of labor, costs, and storage space and is subject to various threats. But the Check Clearing for the 21st Century Act, commonly referred to as "Check 21," federally mandates that recipient banks must now accept electronic images of checks from other banks, thereby reducing costs and physical threats and increasing efficiency. Each electronic image may then be printed to generate an image replacement document, which is the legal equivalent of a physical check.

SUMMARY

This disclosure provides a system and method for communicating secure electronic check images. In one embodiment, for example, software is operable to determine a first hash value for an electronic check image, with the check image operable to generate an image replacement document. The hash value is associated with the electronic check image. The electronic check image and the associated hash value is communicated to a recipient for processing. The details of one or more embodiments of the invention are set forth in the accompanying drawings and the description below. One or more embodiments of the invention may include several important technical advantages. For example, the disclosure may describe a more secure financial network for communicating legal representations of checks. In another example, the disclosure may allow a bank to process an IRD with more assured sense of validity. Of course, various embodiments of the invention may have none, some or all of these advantages. Other features, objects, and advantages of the invention will be apparent from the description and drawings, as well as from the claims.

DESCRIPTION OF DRAWINGS

FIGS. 3A-B are flowcharts illustrating example methods for processing secure electronic check images in accordance with one embodiment of the present disclosure.

DETAILED DESCRIPTION

Figure 1:
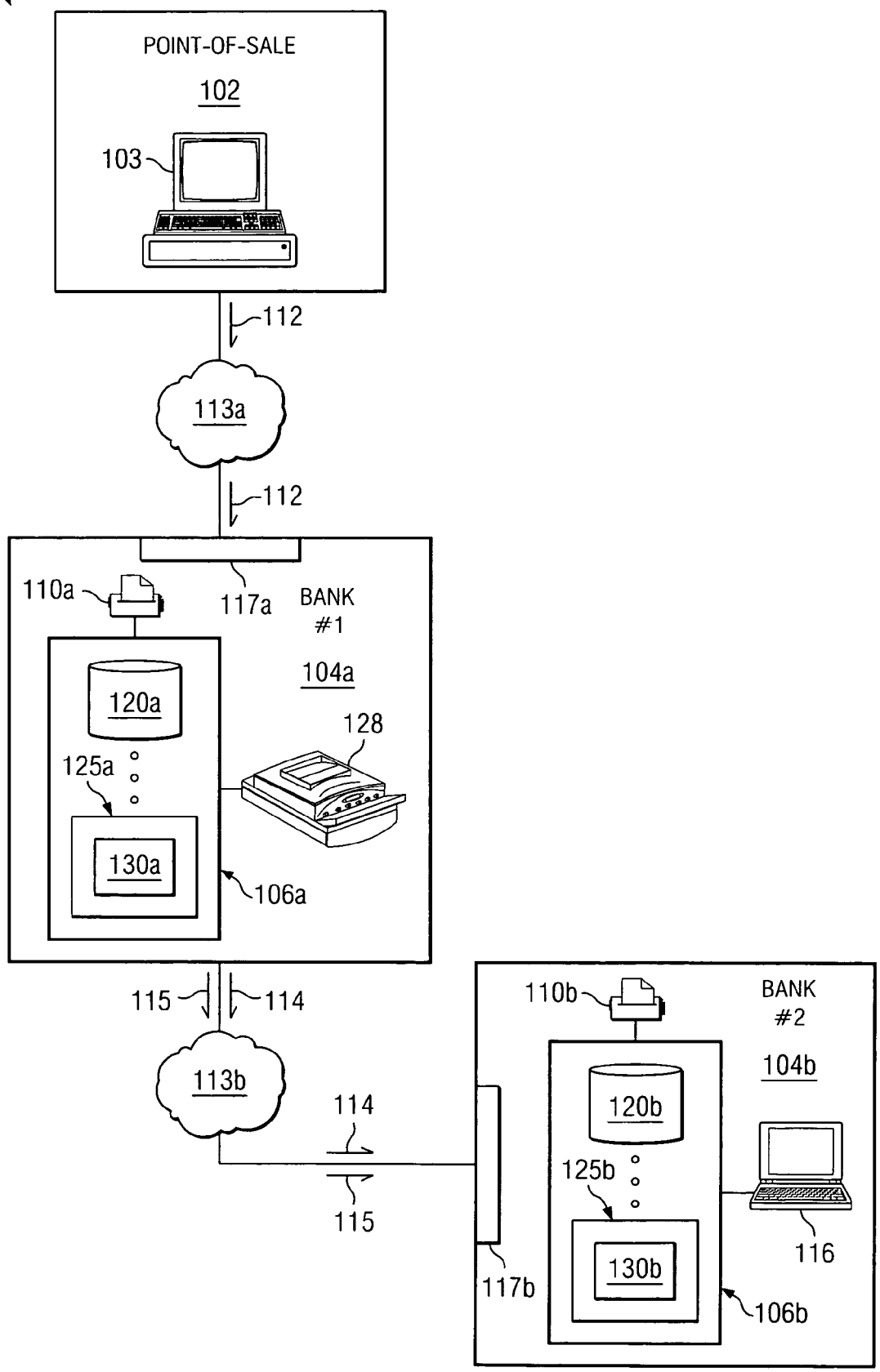
FIG. 1 illustrates a system for communicating secure electronic check images in accordance with one embodiment of the present disclosure.

FIG. 1 illustrates a system 100 for communicating and processing secure electronic check images 114 in accordance with one embodiment of the present disclosure. Generally, system 100 includes at least a portion of any financial or banking system operable to process commercial paper transactions (such as checking), generate at least one electronic check image 114 associated with an image replacement document (IRD) for at least a particular one of the transactions, and securely process, share, or communicate these electronic check images 114. For example, system 100 may receive a physical check at a receiving entity 102, capture an electronic image 114 and check data 115 (such as a Magnetic Ink Character Recognition (MICR) code or a MICR line) from the check at a first financial institution 104, generate a hash value from at least a portion of electronic check image 114, and associate the hash value with electronic check image 114 and check data 115. This hash value and the associated electronic check image 114 are then communicated to a second financial institution 104b. In another example, receiving entity 102 may capture the electronic check image 114 and check 115 for communication to one of the financial institutions 104. Therefore, electronic communications (including electronic images 114 operable to generate IRDs and a check data 115) may be secured, authenticated, or otherwise verified through hash values within system 100. It will be understood that various components of system 100 may use or implement any suitable hashing technique or algorithm, such as MD-5 or proprietary, to determine the hash value (or other similar identifier) based on at least a portion (including all) of electronic check image 114. In certain embodiments, the components may utilize the same hashing technique or algorithm or, alternatively, may communicate an identifier of the utilized technique or algorithm to other components, thereby allowing the other components to appropriately process the hashed image 114.

System 100 is typically (but not necessarily) distributed into at least one receiving entity (or point-of-sale) 102 and two or more financial institutions 106, illustrated as first and second financial institutions 106a and 106b. Often, system 100 is electronically inter-coupled, thereby allowing efficient communications among the various components. But system 100 may be a standalone processing environment, such as system 100 consisting of one financial institution 104 with a plurality of interconnected offices, or any other suitable banking environment operable to dynamically generate hash values for securing electronic communications without departing from the scope of this disclosure. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further contemplates any suitable user or manager interaction with system 100 without departing from the scope of this disclosure.

Receiving entity 102 is any recipient or payee of the checking or other commercial paper transaction. Receiving entity 102 may be a store, an online vendor, a telephony system, or others. Receiving entity 102 may also represent a teller at one of the financial institutions 104 without departing from the scope of the disclosure. In the illustrated embodiment, receiving entity 102 includes a cash register 103 for receiving and storing physical checks 112. Of course, receiving entity 102 may include other additional or alternative components for processing transactions. For example, receiving entity 102 may include a scanner and/or a computer for processing an example check or electronic payment. While not illustrated, the point-of-sale computer may also include or execute a portion or a copy of check processing engine 130 (illustrated in servers 106a and 106b) for performing or implementing hashing or other check processing without departing from the scope of the disclosure. Receiving entity 102 may also be operable to generate an Automated Clearing House (ACH) transaction based on the checking transaction for quickly processing the transaction with financial institutions 104. Regardless, at any appropriate time and using any suitable automatic or manual technique, receiving entity 102 communicates the checks to a first financial institution 104 for subsequent processing.

Financial institution 104 is any agent, third-party resource, clearing house, branch, processing center, or central office of a financial institution. Indeed, while illustrated as two banks, first financial institution 106a and second financial institution 106b respectively, any number of banks and/or other institutions may be included in system 100 without departing from the scope of this disclosure. Moreover, two or more financial institutions 106 may represent two or more routing/transit numbers associated with one institution. In other words, each financial institution 104 may have the same, similar, or distinct components from illustrated financial institutions 104. Returning to the illustrated embodiment, each financial institution 104 includes server 106, printer 110, and scanner 128. Printer 110 is any device operable to generate a hard copy from an electronic image. For example, financial institution 104 may include a plurality of checks or other commercial paper transactions in electronic form, which may then printed as image replacement documents (IRDs) using printer 110. These IRDs may then be considered a legal copy of the associated check. Scanner 128 is any suitable device operable to capture or otherwise obtain information from the received physical transactions, such as the checks from receiving entity 102. For example, scanner 128 may be a scanner, a sorter, or any other similar device (or combination thereof) including a digital camera for recording or generating electronic images 114 of the checks and a MICR reader for capturing check data 115 from the checks. The example digital camera may record an electronic check image 114 of the front and back of each check in black and white, grayscale, and/or color. As used herein, electronic check image 114 may be a digital image or file of the check including the front, the back, both, or any suitable portion thereof. This check image 114 may be in any suitable format including Moving Picture Experts Group (MPEG), Joint Photographic Experts Group (JPEG), Tag Image File Format (TIFF), including any suitable version thereof (such as TIFF 6.0), and others. The MICR reader may capture or generate check data 115 in any appropriate format including E13-B, CMC-7, output from Optical Character Recognition (OCR), as well as others. Check data 115 typically includes MICR line data, which is a plurality of fields including routing/transit field, account field, serial field, and others. But check data 115 may also include, alternatively or in combination, any other readable or identifiable check data including text or other check identification data. In certain embodiments, the first hash value is initially obtained or determined at the initial capture source, whether receiving entity 102 or financial institution 104.

Banking server 106 includes memory 120 and processor 125 and comprises an electronic computing device operable to receive, transmit, process, and store data associated with system 100 and, more specifically, associated financial institution 104. For example, server 106 may be any computer or processing device such as, for example, a blade server, general-purpose personal computer (PC), Macintosh, workstation, a mainframe, or any other suitable device. Generally, FIG. 1 provides merely one example of computers that may be used with the disclosure. For example, although FIG. 1 illustrates one server 106 that may be used with the disclosure, system 100 can be implemented using computers other than servers, as well as a server pool. In other words, the present disclosure contemplates computers other than general purpose computers as well as computers without conventional operating systems. As used in this document, the term "computer" is intended to encompass a personal computer, workstation, network computer, or any other suitable processing device. Server 106 may be adapted to execute any operating system including Linux, UNIX, Windows Server, or any other suitable operating system. According to one embodiment, server 106 may also include or be communicably coupled with a web server and/or a secure financial server.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes electronic check images 114, but memory 120 may include any appropriate data such as an audit log, account information, administration profiling, check data 115, one or more hash values, and others. For example, memory 120 may store electronic check images 114 in an object-oriented or a relational database, typically including tables defined using SQL statements and interrelated using schemas. In this example, one table may store electronic check images 114 and another table store check data 115. In another example, memory 120 may store electronic check images 114 in one or more comma-separated-value (CSV) files, XML documents, Btrieve files, text files, encrypted files, and others.

Server 106 also includes processor 125. Processor 125 executes instructions and manipulates data to perform the operations of server 106 such as, for example, a central processing unit (CPU), a blade, an application specific integrated circuit (ASIC), or a field-programmable gate array (FPGA). Although FIG. 1 illustrates a single processor 125 in server 106, multiple processors 125 may be used according to particular needs and reference to processor 125 is meant to include multiple processors 125 where applicable. In the illustrated embodiment, processor 125 executes check processing engine 130, which generates hash values for electronic check images 114 allowing for verification by second financial institution 104b.

Check processing engine 130 could include any hardware, software, firmware, or combination thereof operable to, among other things, automatically generate hash values from at least a portion of each electronic check image 114. For example, check processing engine 130 may be written or described in any appropriate computer language including C, C++, Java, Visual Basic, assembler, any suitable version of 4GL, and others or any combination thereof. It will be understood that while check processing engine 130 is illustrated in FIG. 1 as a single multi-tasked module, the features and functionality performed by this engine may be performed by multiple modules such as, for example, an image generation module, a check processing module, and an administration module. Further, while illustrated as internal to server 106, one or more processes associated with check processing engine 130 may be stored, referenced, accessed, or executed remotely (such through receiving entity 102). Moreover, check processing engine 130 may be a child or sub-module of another software module (not illustrated) without departing from the scope of this disclosure. In one embodiment, check processing engine 130 may include or be communicably coupled with an administrative workstation or graphical user interface (GUI) 116. For example, the workstation may comprise a computer that includes an input device, such as a keypad, touch screen, mouse, or other device that can accept information, and an output device that conveys information associated with the operation of server 106 or receiving entity 102, including digital data, visual information, or GUI 116. Both the input device and output device may include fixed or removable storage media such as a magnetic computer disk, CD-ROM, or other suitable media to both receive input from and provide output to users through the display, namely GUI 116.

GUI 116 comprises a graphical user interface operable to allow the user of the workstation to interface with at least a portion of system 100 for any suitable purpose. Generally, GUI 116 provides the user of the workstation with an efficient and user-friendly presentation of data provided by or communicated within system 100. GUI 116 may comprise a plurality of customizable frames or views having interactive fields, pull-down lists, and buttons operated by the user. In one embodiment, GUI 116 presents reports that includes the various processed check information and associated buttons and receives commands from the user via one of the input devices. In an alternative embodiment, GUI 116 may be hidden or not implemented. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in system 100 and efficiently presents the results to the user. Server 106 can accept data from the workstation via the web browser (e.g., Microsoft Internet Explorer or Netscape Navigator) and return the appropriate HTML or XML responses using network 113.

Server 106 may also include interface 117 for communicating with other computer systems or components, such as other server 106 or receiving entity 102, over network 113 in a client-server or other distributed environment. In certain embodiments, server 106 receives electronic images of checks from internal or external senders through interface 117 for storage in memory 120 and/or processing by processor 125. Generally, interface 117 comprises logic encoded in software and/or hardware in a suitable combination and operable to communicate with network 113. More specifically, interface 117 may comprise software supporting one or more communications protocols associated with communications network 113 or hardware operable to communicate physical signals.

Network 113 facilitates wireless or wireline communication between computer servers 106 and any other local or remote computer or component, such as all or a portion of a bank posting systems or other intermediate systems. Indeed, while illustrated as two networks, 113a and 113b respectively, network 113 may be a continuous network without departing from the scope of this disclosure, so long as at least portion of network 113 may facilitate communications between the requisite parties or components. In other words, network 113 encompasses any internal or external network, networks, sub-network, or combination thereof operable to facilitate communications between various computing components in system 100. Network 113 may communicate, for example, Internet Protocol (IP) packets, Frame Relay frames, Asynchronous Transfer Mode (ATM) cells, voice, video, data, and other suitable information between network addresses. Network 113 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation receiving entity 102 receives a physical check from a buyer or other payee. After any suitable processing, receiving entity 102 communicates at least this check to first financial institution 104a. For example, receiving entity 102 may collect checks throughout a day or week and communicate these gathered checks to first financial institution 104a in a bundle. Once first financial institution 104a receives the physical checks, it generates an electronic check image 114 for each check using, for example, scanner 128. Often concurrently, first financial institution 104a also captures check data 115 from each check. First financial institution 104a may also sort the electronic images 114 and check data 115 according to recipient bank (illustrated as second financial institution 104b). In this way, first financial institution 104a may parse out or otherwise collect the electronic data for communication to the appropriate recipient financial institution 104b. First financial institution 104a, using check processing engine 130, then generates a hash value for each electronic check image 114 using any portion or all of the respective image 114. This hash value is then associated with the captured check data 115 using any suitable technique. For example, check processing engine 130 may add a pointer from the hash value to check data 115 or may generate a record including all of the MICR fields, for example and the hash value.

First financial institution 104a then sends the appropriate electronic check images 114 to recipient financial institution 104b for processing. As described above, these electronic check images 114 are each operable generate an IRD, thereby reducing or eliminating the need for shipping the physical checks. For example, first financial institution 104 may communicate electronic check images 114 to an office local to recipient financial institution 104a. The local office may print a plurality of IRDs from the received electronic images 114 and provide the IRDs to the recipient financial institution 104b. The local office may also perform hash processing, as described in regard to recipient financial institution 104b below, to verify the authenticity of the IRDs without departing from the scope of the disclosure. Continuing the example, the local office then forwards the electronic check images 114 to the recipient financial institution 104b. In another example, server 106a may communicate electronic check images 114 to recipient financial institution 104b via network 113. However obtained, recipient financial institution 104b then determines a second hash value for each electronic check image 114, often using check processing engine 130b. By comparing the received hash value and the determined second hash value, recipient financial institution 104b is able to verify the received electronic check image 114 has not been tampered with or corrupted. For example, if check processing engine 130b determines that the received and the second hash value are identical, then recipient financial institution 104b may process the particular electronic image 114 as authentic. Second financial institution 104b may also receive check data 115 for each of the received transactions from first financial institution 104a. As described above, each check data 115 may include, reference, or otherwise be associated with the determined hash value for the respective electronic check image 114. Based on this hash value, check processing engine 130b may be operable to associate the particular check data 115 with one of the electronic check images 114, thereby allowing more efficient processing of the electronic data (such as re-associating image 115 and check data 115).

Figure 2A:
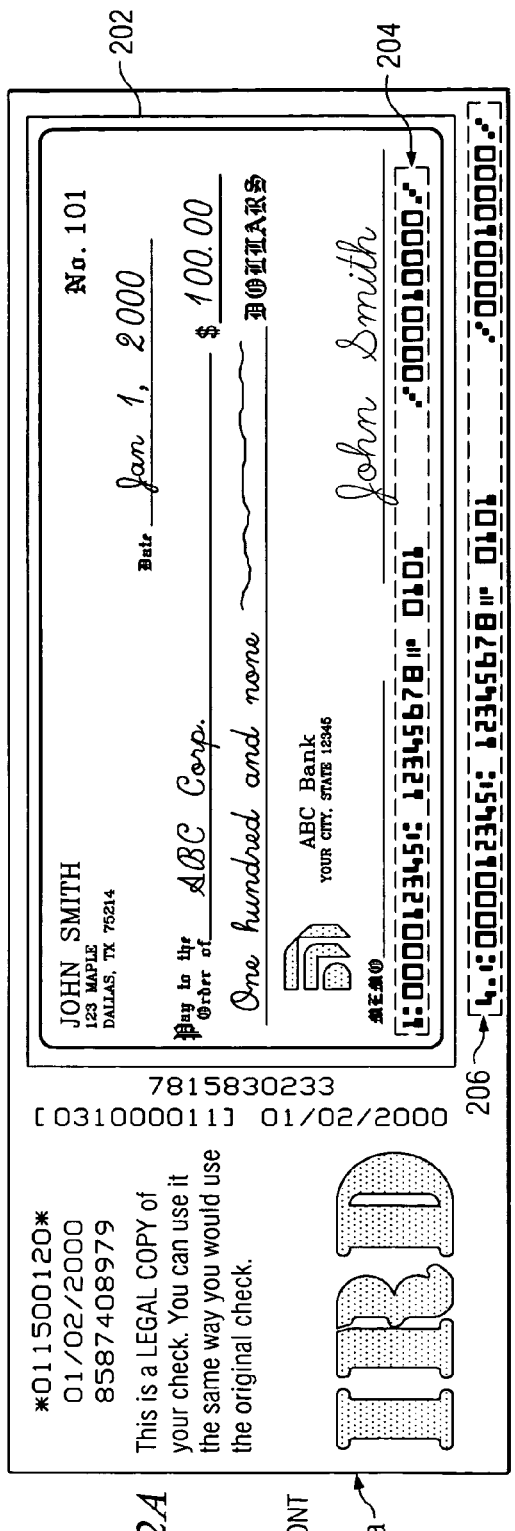
FIGS. 2A-B illustrate one embodiment of an electronic check image in the form of an image replacement document.
Figure 2B:
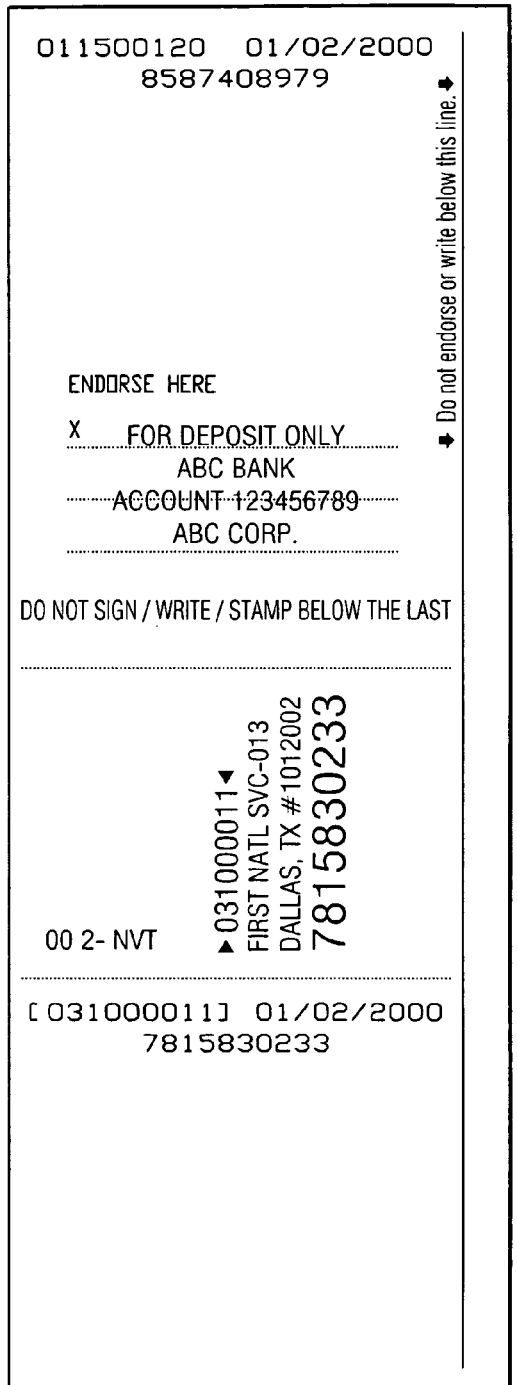

FIGS. 2A-B illustrate one embodiment of an image replacement document 200 from an example electronic check image 114. At a high level, FIG. 2A illustrates the front image 200a of a check 202, while FIG. 2B illustrates the back image 200b of check 202 used by the system of FIG. 1. In this embodiment, check 202 is illustrated as a portion of an IRD 200, which may be considered a legal representation of transaction 202. Transaction 202 is associated with two MICR codes 204 and 206, each generated or captured at different points during transaction processing. For example, MICR code 204 may be preprinted on the check prior to the actual transaction. In this example, MICR code 204 includes an item type indicator of "1," a routing number or field 5 of "12345," an account number of "12345678," and a check number of "101." In this example, MICR code 204 has been supplemented with the captured amount, "100.00," perhaps at the receiving entity 102 or the financial institution 104 of first deposit. MICR code 206 is substantially similar to MICR code 204, with the difference involving the item type indicator. In MICR code 204, the item type indicator is "1", while MICR code 206 includes an item type indicator of "4." FIG. 2B illustrates a back portion of IRD 200. This portion of IRD 200 includes various processing, authorization, and deposit data. For example, the back of the check includes the financial institution 104 of first deposit, namely "First National Bank." The back of the check further describes the date of first deposit, item sequence number, and any endorsement, in this case a stamp of "For Deposit Only."

FIGS. 3A-B are flowcharts illustrating example methods 300 and 350 for processing secure electronic check images 114 in accordance with one embodiment of the present disclosure. At a high level, methods 300 and 350 include first financial institution 104 generating an electronic image 114 and a hash value for a received physical check, communicating both electronic data items to a second financial institution 104b, thereby allowing second financial institution 104 to verify the electronic check image 114. The following description focuses on the operation of a particular check processing engine 130 in performing these methods. But system 100 contemplates using any appropriate combination and arrangement of logical elements implementing some or all of the described functionality.

Method 300 begins at step 302, where first financial institution 104a receives a physical check 112 from receiving entity 102. Of course, first bank 104a may also receive physical check 112 from any other appropriate component or institution. Next, first financial institution 104 generates an electronic image 114 based on received check 112 such as, for example, using scanner 128. At step 304, first financial institution 104a captures or otherwise identifies a check data 115 for received check 112. For example, first financial institution 104a may include scanner 128 with a digital camera operable to capture check data 115 from physical check 112. Next, check processing engine 130a determines a hash value for electronic check image 114 at step 308. As described above, check processing engine 130a the utilize or implement any appropriate hashing algorithm, including MD-5, a proprietary technique, or any other suitable technique or instruction. At step 310, check processing engine 130a associates the determined hash value with electronic check image 114 at step 310. Next, check processing engine 130a associates the hash value with check data 115 at step 312. According to certain embodiments, check processing engine 130a may generate or store a local copy of electronic check image 114, as well as the associated hash value. For example, check processing engine 130a may store the local copy in and audit record or log in memory 120a. In another example, check processing engine 130a may communicate a copy of electronic check image 114 to a data storage repository (not illustrated). At step 316, check processing engine 130a communicates electronic check image 114 and the associated hash value to a recipient financial institution 104b, illustrated in FIG. 1, also termed second financial institution 104b. Next, first financial institution 104a may communicate check data 115 and the associated hash value to the recipient financial institution 104b for other processing, as illustrated in more detail in FIG. 3B.

Method 350 begins at step 352, where recipient financial institution 104b receives electronic check image 114 and the associated hash value. Next, check processing engine 130b determines a second or new hash value for the received electronic check image 114 at step 354. At step 356, check processing engine 130b compares the first and second hash values to help verify that the electronic check image 114 has not been tampered with or corrupted. Next, at decisional step 358, check processing engine 130b determines whether the first and second hash values verify electronic check image 114 such as, for example, by being identical. If the hash values differ, then check processing engine 130b may communicate an error message to the sender, illustrated as first financial institution 104a. check processing engine 130b may also generate an audit record of the error at step 362, or by illustrated processing of this particular electronic check image 114 pounds. If check processing engine 130b determines that the hash values are identical (for example) at decisional step 358, then financial institution 104b may process the verified or authenticated electronic check image 114 using any standard or appropriate processing at step 364. Next, financial institution 104b may generate an image replacement document based on electronic check image 114, using any appropriate technique, such as printing the IRD using printer 110b.

The preceding flowcharts and accompanying descriptions illustrate exemplary method 300 and 350. In short, system 100 contemplates using any suitable technique for performing this and other tasks. Accordingly, many of the steps in this flowchart may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations, and permutations of these embodiments and methods will be apparent to those skilled in the art. For example, receiving entity 102 may process electronic checks, as well as physical checks and other commercial paper. In another example, both the capture and verification techniques may be used by one organization to ensure or revisit the authenticity of checks that are or were in its care. Accordingly, the above description of example embodiments does not define or constrain this disclosure. Other changes, substitutions, and alterations are also possible without departing from the scope of this disclosure.

What is claimed is:

1. A computer-implemented method for communicating electronic check images, performed by executing instructions on a data processor, the method comprising:

determining a hash value based, at least in part, on an electronic check image, the check image enabling generation of an image replacement document;

storing the hash value;

bundling the hash value with the electronic check image;

communicating the electronic check image and the hash value via a data communication network to a recipient device for verification of the electronic check image based, at least in part, on the hash value associated with the electronic image;

adding the hash value to a magnetic ink character recognition (MICR) code to form a MICR message, the MICR code extracted from the electronic check image; and communicating the MICR message via the data communication network to the recipient device separately from the electronic check image and the hash value, thereby enabling the recipient device to associate the received MICR code and the received electronic check image using the hash value.

2. The method of claim 1, wherein the hash value comprises a sixteen byte number.

3. The method of claim 1, wherein the hash value comprises a first hash value and the recipient device verifying the electronic check image comprises:

determining a second hash value based, at least in part, on the received electronic check image; and comparing the received first hash value and the second hash value to verify authenticity of the electronic check image.

4. The method of claim 1, wherein storing the hash value comprises storing the hash value in a volatile memory.

5. A non-transitory computer-readable medium having computer-readable instructions stored thereon for execution by a processor to:

determine a hash value based, at least in part, on an electronic check image, the check image enabling generation of an image replacement document;

store the hash value;

bundle the hash value with the electronic check image;

communicate the electronic check image and the hash value to a recipient for verification of the electronic check image based, at least in part, on the hash value associated with the electronic image;

add the hash value to a magnetic ink character recognition (MICR) code to form a MICR message, the MICR code extracted from the electronic check image; and communicate the MICR message to the recipient separately from the electronic check image and the hash value, thereby enabling the recipient to associate the received MICR code and the received electronic check image using the hash value.

6. The computer-readable medium of claim 5, wherein the hash value comprises a sixteen byte number.

7. The computer-readable medium of claim 5, wherein the hash value comprises a first hash value and the recipient verifying the electronic check image comprises software operable to:

determine a second hash value based, at least in part, on the received electronic check image; and compare the received first hash value and the second hash value to verify authenticity of the electronic check image.

8. The computer-readable medium of claim 5, wherein the software operable to determine the hash value based, at least in part, on the electronic check image comprises software operable to determine the hash value for the electronic check image at a capture source, the capture source generating the electronic check image.

9. An image capture system for communicating electronic check images comprising:

memory storing a plurality of electronic check images, each check image enabling generation of an image replacement document; and one or more processors operable to:

determine a hash value based, at least in part, on at least one of the electronic check images;

store the hash value;

bundle the hash value with the electronic check image;

communicate the electronic check image and the hash value to a recipient for verification of the electronic check image based, at least in part, on the hash value associated with the electronic check image;

add the hash value to a magnetic ink character recognition (MICR) code to form a MICR message, the MICR code extracted from the electronic check image; and communicate the MICR message to the recipient separately from the electronic check image and the hash value, thereby enabling the recipient to associate the received MICR code and the received electronic check image using the hash value.

10. The image capture system of claim 9, wherein the hash value comprises a sixteen byte number.

11. The image capture system of claim 9, the hash value comprising a first hash value, the recipient verifying the electronic check image comprises the recipient operable to:

determine a second hash value based, at least in part, on the received electronic check image; and compare the received first hash value and the second hash value to verify authenticity of the electronic check image.

12. A computer-implemented method for processing a check using an electronic check image, performed by executing instructions on a data processing apparatus, the method comprising:

receiving via a data communication network an electronic check image, the check image enabling generation of an image replacement document;

receiving via the data communication network a hash value for the electronic check image;

using the data processing apparatus to verify the electronic check image using the hash value;

receiving via the data communication network a magnetic ink character recognition (MICR) message separately from the electronic check image, the MICR message comprising the hash value and a MICR code extracted from the electronic check image; and using the data processing apparatus to associate the received MICR code and the received electronic check image using the hash value.

13. The method of claim 12 further comprising:

determining a second hash value based, at least in part, on the received electronic check image; and comparing the received hash value and the second hash value to verify authenticity of the electronic check image.

* * * * *